United States Patent [19]

Dominguez

[11] 4,006,116
[45] Feb. 1, 1977

[54] BLOCK COPOLYMER COMPOSITIONS AND ARTICLES

[75] Inventor: Richard J. G. Dominguez, Katy, Tex.

[73] Assignee: Shell Oil Company, Houston, Tex.

[22] Filed: Nov. 26, 1975

[21] Appl. No.: 635,564

[52] U.S. Cl. .................... 260/33.6 AQ; 36/32 R;
260/876 B; 260/880 B
[51] Int. Cl.² .................... A43B 13/04; C08K 5/01
[58] Field of Search .............. 260/33.6 AQ, 876 B,
260/880 B; 36/32 R

[56] References Cited

UNITED STATES PATENTS

| | | |
|---|---|---|
| 3,589,036 | 6/1971 | Hendricks et al. ............... 36/32 R |
| 3,766,295 | 10/1973 | Crossland et al. ............. 260/876 B |
| 3,917,607 | 11/1975 | Crossland et al. ............. 260/880 B |

*Primary Examiner*—Donald E. Czaja
*Assistant Examiner*—H. H. Fletcher
*Attorney, Agent, or Firm*—Dean F. Vance

[57] ABSTRACT

Compositions comprising block copolymer blends including both high molecular weight and low molecular weight selectively hydrogenated block copolymers together with certain blending components, have been found to have improved performance especially for use in footwear articles.

8 Claims, No Drawings

BLOCK COPOLYMER COMPOSITIONS AND ARTICLES

The use of certain block copolymers and their compounds in a number of end-uses and especially in footwear, is rapidly becoming a large scale business. For example, in the footwear industry, certain block copolymer compounds are being used in large volume in the manufacture of a wide variety of shoes including canvas shoes, sport shoes, and dress shoes. The block coploymers may be utilized for this purpose for soling, foxing, inner-soles and the like. These are referred to in Hendricks et al. patent U.S. Pat. No. 3,589,036. In general, the shoe component compositions usually comprise a mixture of block copolymer, extending oil, polystyrene and possibly a filler. Many other end-uses of block polymers are known, such as in pharmaceutical applications, sportswear and other artifacts. For the most part, they have proved to be an advance in the pertinent arts in many respects including flexibility, processability, lack of vulcanization requirement and wet slip. However, in certain respects, short-comings have been noted, which it would be desirable to eliminate or improve upon. Again referring to footwear, one of the major short-comings of the block copolymer compounds such as those referred to in U.S. Pat. No. 3,589,036, is the phenomenon known as "elephant hide". Moreover, these prior art compounds are often difficult to remove from molds and are prone to exhibit surface markings.

The term elephant hide refers to a problem primarily apparent in relatively thick sections of stock, whether it be soling, heavy sheeting or the like. The phenomenon is readily apparent when the compound deficient in this respect is flexed. During the flex, the compressed surface of such articles exhibits a ridged appearance.

It is an object of the present invention to provide improved block copolymer compositions. It is another object of the invention to provide improved block copolymer compositions exhibiting improved physical properties leading to elimination of elephant hide, improved flex cracking resistance, reduced tendency to buckle or kink and elimination of mold markings. Other objects will become apparent during the following detailed description of the invention.

Now, in accordance with the present invention, the above and other objects are satisfied by compositions comprising 100 parts by weight of mixtures of certain hydrogenated block copolymers, 50-150 parts by weight of a hydrocarbon rubber extending oil, and 25-90 parts by weight of an alpha-olefin polymer having a melt flow between about 5 and 25 dg/min. These compositions may or may not contain resins, fillers anti-oxidants, etc. as more fully defined hereinafter. The invention especially contemplates compositions containing two types of block copolymers as follows: For each 100 parts by weight of total block copolymers; 50-90 parts by weight of this should be at least one block copolymer A having at least two monoalkenylarene polymer blocks and at least one substantially completely hydrogenated polymer block of a conjugated diene, said copolymer comprising 25-30% by weight of monoalkenylarene polymer blocks, each of the latter having an average molecular weight between 7,500 and 15,000.

The second type of block copolymer contained in 100 parts by weight of total block copolymer, comprises 10-50 parts by weight of at least one block copolymer B of the same generic class as block copolymer A wherein the copolymer comprises 25-30% by weight of monoalkenylarene polymer blocks, each of the latter having an average molecular weight between about 20,000 and 37,000. It has been found in accordance with this invention, that such compositions exhibit the desired combination of physical properties, namely, virtual elimination of elephant hide, release from molds with relative ease, absence of weld lines and extemely high flex crack resistance.

The general type and preparation of the block copolymers considered here are described in U.S. Pat. No. 3,589,036 and in many other U.S. and foreign patents. These may be linear or branched polymers usually formed by living polymer techniques and prepared either by sequential introduction of the desired monomers or by a combination of polymerization and coupling techniques well-known in this art. Selective hydrogenation of polymer blocks also is well-known, as described in U.S. Pat. No. 3,595,942. The hydrogenation is conducted until at least about 95% and preferably at least about 99% of the olefinic double bonds, in the diene blocks are reduced. This results in the formation of a polymer block which is or closely resembles a polyolefin block.

When the diene employed is butadiene, it is preferred that polymerization conditions be adjusted to result in a polymer block having from about 25 to 45% 1, 2 structure. Thus, when such a block is hydrogenated, the resulting product is, or resembles, a regular copolymer block of ethylene and butene-1. If the conjugated diene employed is isoprene, the resulting hydrogenated product is or resembles a regular copolymer block of ethylene and propylene. Of course, direct synthetic preparation may be employed involving block polymerizaton of monoalkenylarene with alpha-olefin mixtures resulting in block copolymers similar to those described above. The claims will be understood to include block copolymers prepared by this direct procedure as well as by the hydrogenation process.

The individual polymer blocks may contain up to about 35% by weight of copolymerizable monomers. These may comprise for example, a copolymerizable of conjugated dienes with monoalkenylarene in either of the essential blocks described. Furthermore, it is contemplated that polar monomers such as monovinylpyridine, acrylonitrile or esters of acids of the acrylic acid series such as methylmethacrylate as well as unsaturated estes such as vinylacetate may be used as interpolymerizing or copolymerizing components of that polymers thereof may be grafted on the preformed block copolymer chains.

It is preferred that the proportion of block copolymer A have the structure polystyrene-hydrogenated butadiene-polystyrene (or a branched homolog thereof); the polystyrene blocks comprise 27-33% of the copolymer and each polystyrene block having an average molecular weight between about 9,000 and 13,000. It is also preferred that block copolymer B have the same monomer identity as block copolymer A and that the copolymer B have polystyrene blocks comprising 28-35% by weight of the copolymer, each of said blocks having an average molecular weight between about 23,000 and 35,000. It is furthermore preferred that in 100 parts by weight of the pairs of block copolymers, copolymer A comprise 60-80 parts and copolymer B comprise 20-40 parts. The molecular weights referred to in this specification are number average molecular weights determined, for example, by gel permeation chromatography procedures.

The alpha-olefin polymers to be combined with the essential blend of the above-described block copolymers include particularly polyethylene, polypropylene, the impact grades of these polymers and copolymers such as ethylene/propylene copolymer. Polypropylene is the preferred polymer.

The polyolefin resins should have melt flows between about 5 and 25 dg/min. The impact grades if used, may comprise for example ethylene-modified copolymers of polypropylene or mixtures of polypropylene with ethylene/propylene random copolymers. The impact component normally comprises 1–30 weight percent of the total polyolefin.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F.

The resins which may be employed in amounts of 0–35 parts by weight per 100 parts of block copolymers are those which are especially compatible with the monoalkenylarene polymer blocks and include, but are not restricted, to atactic polypropylene oligomers, polymers of alphamethylstyrene and copolymers to alphamtehylstyrene and vinyltoluene.

Thus, the composition showing improved physical properties as set out above are the following:

| | Parts by Weight |
|---|---|
| Block Copolymers | 100 |
| Copolymer A | 50–90 |
| Copolymer B | 50–10 |
| Extender Oil | 50–150 |
| Alpha-olefin Polymer | 25–90 |
| Resin | 0–35 |
| Filler | 0–150 |

The finely divided fillers which are optional components included calcium carbonate, clay, titanium dioxide, and carbon blacks.

while the present specification emphasizes the use of these compositions in footwear components, other end-uses also are contemplated. These include for example wire and cable coatings. The present compositions, when so utilized, result in wire and cable products which can be tightly bent or coiled without buckling of the coating. Tubular products such as hoses and the like also are contemplated.

The use of the present composition in footwear includes especially their use in soling when prepared by injection molding and slab soling, such as produced by cutting shoe sole forms from extruded slab-stock. The advantages in these compositions is most apparent in injection molding of unitsoles which are later attached by adhesion or sewing to uppers. In this situation, it has been found that the unitsoles are readily removed from the injection mold and do not leave weld lines on the surface. Furthermore, that the surface of the sole so produced is resistant to marring, has a relatively low abrasion, exhibits virtually no elephant hide, and is manufactured with a relatively short cycle time in the mold. These unitsoles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper.

The compounds of this invention may be combined by processes known in the art including blending such as by extrusion, Banbury mixing or by dry-blending procedures. In the latter case, it is preferred that the block copolymer be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art.

One special utility of these compositions comprises gloves especially contemplated for use in sports such as golf or in activities such as the driving or steering of equipment. The compositions are especially useful in several respects in that they may be formulated to resemble the general hardness of the hand, thus reducing the tension and numbness often experienced such as by bicycle riders or equipment drivers. Secondly, the compositions are especially useful as glove surfaces since they do not tend to form ridges or buckle when flexed around the handle of the sports equipment or steering mechanism. Thirdly, they have an indefinately long life when used as glove surfaces as opposed to the relatively short life of similar compositions applied to the surface of the sports equipment or steering wheels and held thereon under high tension.

The following examples illustrate the improvement gained by use of the present invention.

EXAMPLE I

The following compositions were prepared by extrusion blending as follows:

| | Parts by Weight | | | |
|---|---|---|---|---|
| | Prior Art | | This Invention | |
| | A | B | No. 1 | No. 2 |
| Block copolymer A | 100 | — | 60 | 80 |
| Block copolymer B | — | — | 40 | 20 |
| Block copolymer C | — | 100 | — | — |
| Extending oil | 100 | 98 | 100 | 100 |
| Polystyrene | — | 60 | — | — |
| Polypropylene, melt flow 12 dg/min. | 50 | — | 50 | 50 |
| Resin | 20 | 10 | 20 | 20 |
| Melt Flow of Compound, dg/min. | 20 | 15 | 4.5 | 14 |
| Taber Abrasion of Unitsole | 0.50 | 0.35 | 0.20 | 0.35 |
| Cut Growth resistance | 1MM | 100M | 2MM+ | 2MM+ |

It will be noted that prior art composition B compared with the two compositions according to the present invention in the above table contained block copolymer C which was a branched block copolymer of styrene and butadiene containing 44 wt percent bound styrene. Block copolymer A had the structure polystyrene-hydrogenated polybutadiene-polystyrene with average block molecular weights of 10,000-54,000-10,000. Block copolymer B had the same block identity, the block molecular weights being 29,000-116,000-29,000. The resin contained in prior art compound A was a methylstyrene/vinyltoluene copolymer sold commercially as Piccotex 120. The resin employed in the prior art composition B and the compounds according to this invention was an alphamethylstyrene polymer sold commercially as Amoco 18-290. These compounds were injection molded in a Monopak mold attached to a Desma molding machine to form unitsoles. The cycle time for prior art compound B was 120 seconds while the cycle time for the other unitsoles was 90 seconds.

The unitsoles formed from the prior art compounds were difficult to remove from the mold and showed weld lines on the surface while the unitsoles formed from compounds of this invention were easily removed and showed no weld lines. The unitsoles of the prior art showed relatively high abrasion as compared with the unitsoles of this invention. When the unitsole of the prior art was flexed to about a 90° angle, a serious evidence of elephant hide could be seen on the inner surface of the flexed article. However, under similar flexing, the unitsoles of this invention showed no elephant hide. Finally, as shown by the above table, the cut growth resistance of the compositions according to the present invention was found to be far superior to that of the prior art compound.

Tests

Cut growth: A cut of standard dimensions (one-tenth inch) is imparted on a strip of molded material. The number of flexes necessary to propagate the cut to 500% growth is measured (0.6 inches).

Taber abrasion: A disc of material is abraded under standard conditions by two abrasion wheels. The number of CC abraded off in 1000 cycles is measured as a function of the weight lost in 1000 cycles divided by the density of the material.

I claim as my invention:

1. A composition comprising:
    a. 100 parts by weight of block copolymers including
        $a_1$ 50-90 parts by weight of at least one block copolymer A having at least two monoalkenylarene polymer blocks and at least about 95% hydrogenated polymer block of a conjugated diene, said copolymer comprising 25-35% by weight of monoalkenylarene polymer blocks, each of the latter having an average molecular weight between about 7,500 and 15,000;
        $a_2$ 10-50 parts by weight of at least one block copolymer B having at least two monoalkenylarene polymer blocks and at least about 95% hydrogenated polymer block of a conjugated diene, said copolymer comprising 25-36% by weight of monoalkenylarene polymer blocks, each of the latter having an average molecular weight between about 20,000 and 37,000;
    b. 50-150 parts by weight of a hydrocarbon oil containing less than about 30% by weight of aromatics;
    c. 25-90 parts by weight of an alpha-olefin polymer having a melt flow between 5 and 25 dg/min.;
    d. 0-35 parts by weight of resin; and
    e. 0-150 parts by weight of a finely divided filler.
2. A footwear component comprising a composition according to claim 1.
3. A footwear component according to claim 2 comprising a unitsole.
4. A composition according to claim 1 wherein the resin comprises a polymer of an alkyl ester of an acid of the acrylic acid series.
5. A composition according to claim 1 wherein the block copolymer A has the structure polystyrene-hydrogenated polybutadiene-polystyrene, the polystyrene block having an average molecular weight between about 9,000 and 13,000.
6. A composition according to claim 1 wherein the block copolymer B has the structure polystyrene-hydrogenated polybutadiene-polystyrene, the polystyrene blocks comprising 28-35% by weight of the copolymer, each polystyrene block having an average molecular weight between about 23,000 and 35,000.
7. A composition according to claim 4 wherein the resin is a poly (methylmethacrylate).
8. A composition according to claim 1 wherein the resin is a polyurethane.

* * * * *